United States Patent
Hutchison et al.

(10) Patent No.: US 6,592,351 B2
(45) Date of Patent: Jul. 15, 2003

(54) TURRET LOADING DEVICE FOR EXTRUSION LINE

(75) Inventors: Herbert L. Hutchison, Blacklick, OH (US); Robert White, Jr., Westerville, OH (US)

(73) Assignee: Crane Plastics Company LLC, Columbus, OH (US)

( * ) Notice: Subject to any disclaimer, the term of this patent is extended or adjusted under 35 U.S.C. 154(b) by 368 days.

(21) Appl. No.: 09/766,768

(22) Filed: Jan. 22, 2001

(65) Prior Publication Data

US 2002/0098254 A1 Jul. 25, 2002

(51) Int. Cl.⁷ .............................................. B29C 47/90
(52) U.S. Cl. ........................ 425/71; 425/183; 425/186; 425/190; 425/325; 425/326.1
(58) Field of Search ..................... 425/71, 183, 186, 425/188, 190, 192 R, 325, 326.1, 388

(56) References Cited

U.S. PATENT DOCUMENTS

| | | | |
|---|---|---|---|
| 3,299,474 A | * 1/1967 | Ashworth, Jr. | 425/190 |
| 3,745,646 A | 7/1973 | Kristiansson | 29/568 |
| 4,401,424 A | * 8/1983 | De Zen | 425/326.1 |
| 4,408,477 A | 10/1983 | Kummerling et al. | 72/478 |
| 4,436,635 A | 3/1984 | Abrams et al. | 210/806 |
| 4,700,453 A | 10/1987 | Strate et al. | 29/568 |
| 4,823,539 A | 4/1989 | Kuckhermann et al. | 53/579 |
| 4,952,366 A | 8/1990 | Gelin | 264/511 |
| 5,030,049 A | 7/1991 | Voss | 409/282 |
| 5,078,257 A | 1/1992 | Carter, Jr. | 198/369 |
| 5,152,050 A | 10/1992 | Kaczmarek et al. | 29/711 |
| 5,186,304 A | 2/1993 | Kaczmarek et al. | 198/346.1 |
| 5,340,295 A | * 8/1994 | Preiato et al. | 425/71 |
| 5,370,745 A | 12/1994 | Litteral | 118/669 |
| 5,370,835 A | 12/1994 | Sturtz | 264/248 |
| 5,373,136 A | 12/1994 | Ernst et al. | 219/121.67 |
| 5,468,442 A | * 11/1995 | Brambilla | 264/519 |
| 5,516,270 A | * 5/1996 | Lehtinen | 425/71 |
| 5,525,052 A | * 6/1996 | Czarnetzki et al. | 425/190 |
| 5,593,700 A | 1/1997 | Stilgenbauer | 425/3 |
| 5,607,638 A | * 3/1997 | Cadwell | 425/325 |
| 5,780,071 A | * 7/1998 | Racioppi et al. | 425/186 |
| 5,823,036 A | 10/1998 | Matsunaga | 72/181 |
| 5,943,756 A | * 8/1999 | Racioppi et al. | 425/326.1 |
| 5,993,143 A | 11/1999 | Eltze et al. | 414/752 |

* cited by examiner

Primary Examiner—James P. Mackey
Assistant Examiner—Joseph Leyson
(74) Attorney, Agent, or Firm—Standley & Gilcrest LLP

(57) ABSTRACT

The present invention includes an extrusion line system capable of simultaneous running and retooling. The invention utilizes a turret device having an upper surface adapted to rotate about a central point. The turret device has on its upper surface a first and second production line portion. The production line portions are positioned on the upper surface such that when the turret device is in one position the first production portion may be used with an extrusion device. When the turret device is in a second position, the second production portion may be used. This approach allows retooling of one of the production portions while the other production portion is running on the line.

27 Claims, 2 Drawing Sheets

TURRET LOADING DEVICE FOR EXTRUSION LINE

BACKGROUND AND SUMMARY OF THE INVENTION

The present invention relates generally to methods of retooling a production line. Specifically, the invention relates to the swapping out of sizing apparatus on an extrusion line.

In the extrusion industry, as with most industries, it is desirable to minimize downtime as much as possible. When switching between product runs, it is typically necessary to shut down a production line for a number of hours in order to setup the next product. Apparatus has been designed to allow retooling of a line by sliding the sizing for a first product to one side of the extrusion line and bringing in the new sizing for a second product from the other side. Then, when switching to a third product, the sizing for the second product may be pulled back to the other side of the line. The sizing for the first product is retooled during the second product run, such that the tooling for the third product may simply be moved back into place.

One problem with this approach is that the sizing equipment requires a significant amount of space for retooling, and the sliding approach requires that amount of space on each side of the production line. Since there is often not a lot of free space in a manufacturing environment, it is desirable to find a way of retooling that minimizes the amount of space needed. Another problem with using the sliding approach in a limited area is that an operator may be forced to reach across the front sizing, which is in active operation on the line, in order to reach the back sizing for purposes of retooling and adjustments. This raises serious safety issues for the operator and the manufacturer.

It is therefore an object of the present invention to develop a method for quickly, safely, and efficiently swapping out sizing apparatus in an extrusion line that requires a minimal amount of space on the production floor.

The present invention includes an extrusion line system capable of simultaneous running and retooling, only requiring the system downtime necessary for rotating into position and connecting the retooled sizing. The system utilizes an extrusion device to generate a flow of extruded product. A first production portion receives the flow of extruded product. The first production portion contains a first sizing apparatus to shape the flow of extruded product, and a first cooling device to cool the first sizing apparatus. A second production portion is located a distance from the extrusion device. The second portion includes a second sizing apparatus adapted to shape the flow of extruded product when placed in proper contact with the extrusion device, and a second cooling device. The invention utilizes a turret device having an upper surface adapted to rotate about a central point. The turret device has on its upper surface the first and second production portions. The production portions are positioned on the upper surface such that when the turret device is in one position the first production portion may be used with the extrusion device. When the turret device is in a second position, the second production portion may be used.

In an alternative embodiment, only one cooling device may be used that is adapted to detach from the system. In this case, only the first and second sizing devices would need to be included on the turret.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
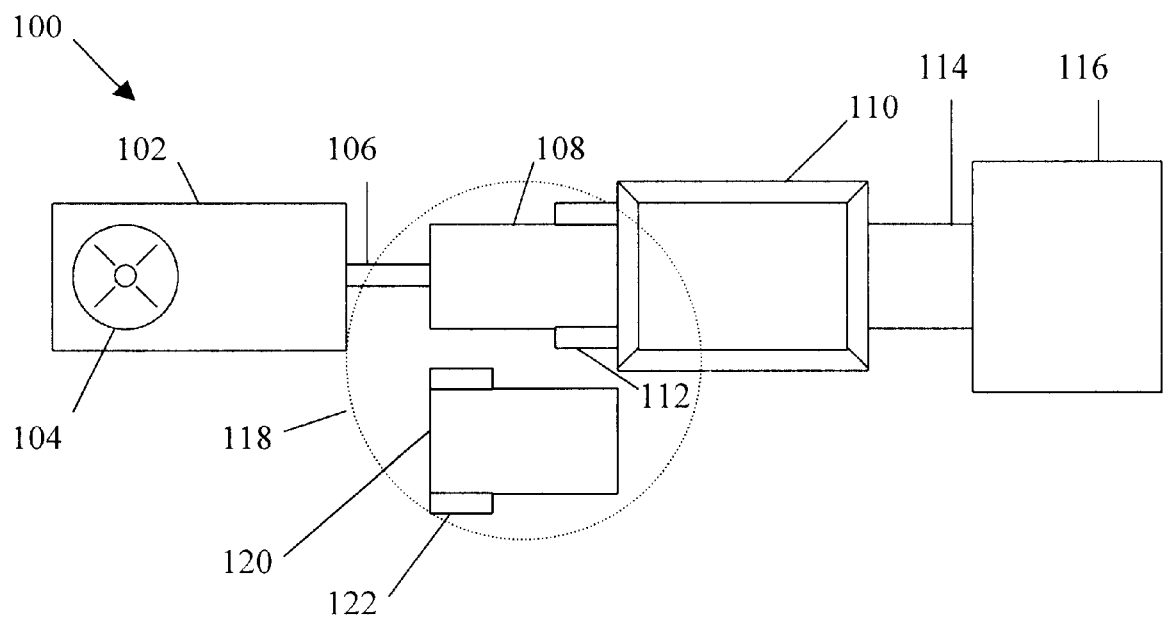
FIG. 1 is a diagram of a first turret system that may be used in accordance with one embodiment of the present invention.

The present invention is directed to a turret system for rotating sizing apparatus on an extrusion line. FIG. 1 shows a preferred embodiment of a system 100 of the present invention. FIG. 1 shows an extruder 102 having a feeder throat 104 for inserting a plastic or other appropriate extrusion material. The flow of extruded material, often a continuous flow, passes from the extruder 102 along a first path 106 into a sizing device 108. In the sizing device, the flow is formed into the appropriate shape and slightly cooled so as to skin before exiting the sizing. The sizing preferably sits in a short cooling pan 112. Upon exiting the sizing 108, the extrudate passes into a water pan 110, liquid bath, or other appropriate cooling device. The cooling media in the pan removes heat from the extrudate such that it sufficiently solidifies. The solidified extrudate then passes along a conveyor 114 into an appropriate auxiliary device 116, such as a cutting device adapted to portion the extrudate into segments of appropriate length. The water pan 136 is preferably detachable, and is preferably placed on rollers, a swing, a conveyor, or a sliding apparatus, such that the water pan may be moved out of, or down, the production line to allow the turret to pivot.

In order to minimize the time it takes to retool the line between products, the system 100 also utilizes a second sizing apparatus 120. The second sizing apparatus sits in a second short pan 122. The addition of the second sizing 120 and second pan 122 allows setup of the next product line while the current line is still running. In order to facilitate the swapping of the sizings and short pans, the first and second sizing 108, 120 and first and second short pans 110, 122 are placed on a rotatable turret 118. The turret 118 is adapted to rotate a sufficient amount, preferably at least 180 degrees, such that when the turret is rotated the first sizing 108 is removed from the production line and the second sizing 120 may be placed in proper position for the line. In order for the sizing and pan to clear the extrusion device while rotating, the sizing is preferably adapted to back away from the extrusion device. This may be done manually, through hand cranks or other appropriate means, but is preferably done by a motorized control. The sizing may then motor back into place for a subsequent extrusion process. Each sizing apparatus may be mounted to the turret using a male/female connection, thereby eliminating the need for tools or clamp mechanisms. This connection method enhances the overall quick-change design.

The turret may be adapted to rotate manually, or may be guided by a computer or other appropriate controlling device. The turret may be mounted and constructed using any appropriate means known or further developed for rotating a substantially horizontal, substantially planar member. Once the second sizing 124 is in place, only minimal work is required to prep the line, such as attaching any cooling hoses that may be required, checking alignment, and ensuring that the first path and conveyor 106, 114 are properly setup.

The turret preferably also comprises an adjustable stand below the planar member. This stand preferably has hand adjustments or motorized adjustments in order to level the stand or shift the turret vertically in order to better align the components of the system. The turret may optionally be mounted on other appropriate pieces of equipment, such as carts and fabricating tools.

The turret preferably also has a quick connect/disconnect mechanism for all appropriate hoses for the sizing device. These hoses may include flows of cooling liquid or cool air, and/or may be adapted to provide vacuum. A single connection is preferred that will automatically connect all appropriate hose lines. The stand preferably has a switch or dial that has appropriate hose connection configurations for possible setups. For instance, one dial setting might provide a source of water and vacuum for an appropriate hose setup of a sizing, while another might provide a stream of air to skin a flow exiting a sizing.

Figure 2:
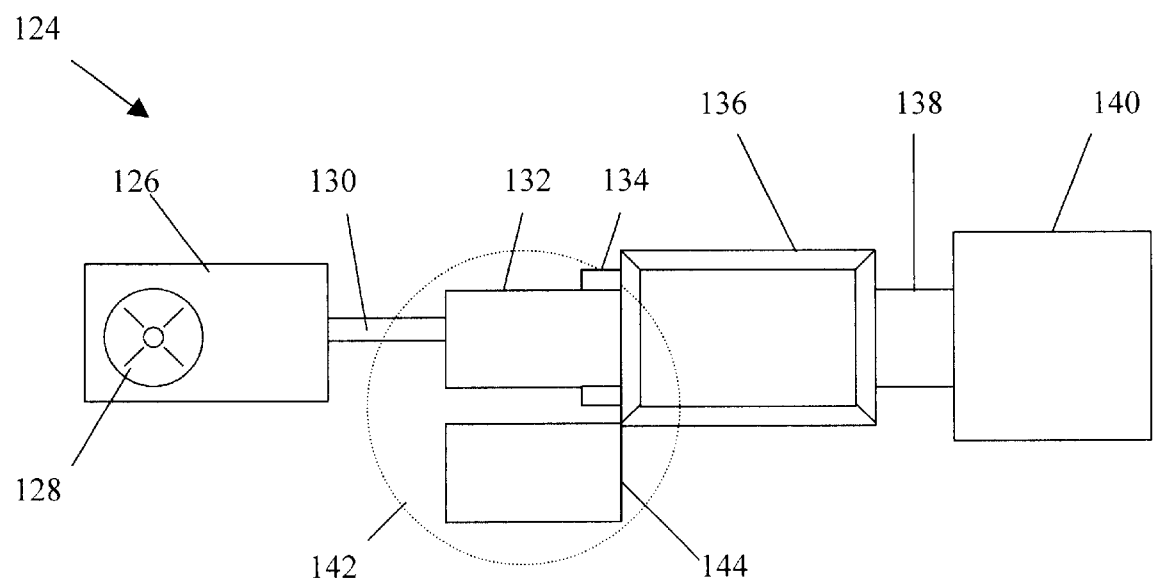
FIG. 2 is a diagram of a second turret system that may be used in accordance with one embodiment of the present invention.

FIG. 2 shows a second embodiment of a system 124 of the present invention. In this embodiment, the system again utilizes an extruder 126 having a feeder throat 128, which passes an extrusion along a first path 130 to a sizing apparatus 132. The sizing again sits in a short pan 134. The shaped extrusion exiting the sizing then passes directly into a water pan 136, then along a conveyor 138 to the auxiliary apparatus 140. The difference in this embodiment, however, is that the short pan is attached to the water pan 136. The water pan 136 is again preferably placed on rollers, or on a swing, conveyor, or sliding apparatus, such that the water pan may be moved out of the production line. In this embodiment, however, the short pan 134 is attached to the water pan 136 such that it also may be backed out of the system before rotating the turret 142. In this way, the turret 142 only has to support the first sizing 132 and the second sizing 144. Since the short pan requires a larger area to rotate, because of its protruding corners, this approach significantly reduces the necessary size of the turret, such as down to a turret of 18 inches in diameter, and the amount of space needed on the production floor in order to retool the production line.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. An extrusion line system capable of simultaneous running and retooling, said system comprising:
   (a) an extrusion device adapted to generate a flow of extruded product;
   (b) a first production portion adapted to receive said flow of extruded product, said first production portion comprising:
      (i) a first sizing apparatus adapted to shape said flow of extruded product; and
      (ii) a first cooling device adapted to cool said first sizing apparatus;
   (c) a second production portion located a distance from said extrusion device, said second production portion comprising:
      (i) a second sizing apparatus, said second sizing apparatus adapted to shape said flow of extruded product when placed in proper contact with said extrusion device; and
      (ii) a second cooling device adapted to cool said second sizing apparatus; and
   (d) a turret device, said turret device having an upper surface adapted to rotate about a central point of said upper surface through at least a first and second position, said turret device having located on said upper surface said first and second production portions, said first and second production portions positioned on said upper surface such that when said turret device is in said first position said first production portion may be used with said extrusion device, and when said turret device is in said second position said second production portion may be used with said extrusion device.

2. An extrusion line system according to claim 1 additionally comprising a coolant bath adapted to receive a shaped flow exiting one of said first and second sizing apparatus.

3. An extrusion line system according to claim 2 wherein said coolant bath is adapted to detach from said system.

4. An extrusion line system according to claim 3 wherein said detachment of said coolant bath is accomplished by a movement device selected from the group consisting of rollers, wheels, swing devices, conveyors, or sliding apparatus.

5. An extrusion line system according to claim 1 wherein one of said first and second cooling devices is selected from the group consisting of coolant pans, liquid baths, flows of cooled liquid, and flows of cooled gas.

6. An extrusion line system according to claim 1 wherein said turret device may be rotated manually.

7. An extrusion line system according to claim 1 additionally comprising a controller adapted to control said rotation of said turret device.

8. An extrusion line system according to claim 1 additionally comprising a cutting device adapted to receive said cooled, shaped flow exiting one of said first and second cooling devices.

9. An extrusion line system according to claim 1 wherein said turret device additionally comprises a stand.

10. An extrusion line system according to claim 9 wherein said stand is adjustable.

11. An extrusion line system according to claim 1 wherein at least one of said first and second sizing apparatus comprises a set of hosing providing channels through said at least one of said first and second sizing apparatus.

12. An extrusion line system according to claim 11 wherein said turret device additionally comprises a quick disconnect adapted to allow a single connection point for said set of hosing.

13. An extrusion line system according to claim 11 wherein said set of hosing is adapted to provide at least one source selected from the group consisting of cooled liquid, cooled gas, and vacuum.

14. An extrusion line system according to claim 11 wherein said first sizing apparatus and said second sizing apparatus are connected to said turret device via a male/female connection.

15. An extrusion line system according to claim 11 wherein said turret device is mounted on a piece of equipment selected from the group consisting of carts, frames, and fabricating tools.

16. An extrusion line system capable of simultaneous running, and retooling, said system comprising:

(a) a extrusion device adapted to generate a flow of extruded product;

(b) a first sizing apparatus adapted to receive said flow of extruded product and eject a shaped flow of said extruded product when placed in proper contact with said extrusion device;

(c) a second sizing apparatus adapted to receive said flow of extruded product and eject a shaped flow of said extruded product when placed in proper contact with said extrusion device;

(d) a cooling apparatus adapted to contact one of said first and second sizing apparatus when placed in proper contact with said extrusion device, said cooling device comprising:

(i) a first cooling device adapted to cool one of said first and second sizing apparatus when placed in proper contact with said extrusion device; and (ii) a second cooling device adapted to cool said shaped flow exiting one of said first and second sizing apparatus placed in proper contact with said extrusion device; and (e) a turret device, said turret device having an upper surface adapted to rotate about a central point of said upper surface through at least a first and second position, said turret device having located on said upper surface said first and second sizing apparatus, said first and second sizing apparatus positioned on said upper surface such that when said turret device is in said first position said first sizing apparatus may be used with said extrusion device, and when said turret device is in said second position said second sizing apparatus may be used with said extrusion device.

17. An extrusion line system according to claim 16 wherein at least one of said first and second cooling devices is selected from the group consisting of water pans, liquid baths, and flows of cooled liquid.

18. An extrusion line system according to claim 16 wherein said cooling apparatus is adapted to detach from said system.

19. An extrusion line system according to claim 18 wherein said detachment of said cooling apparatus is accomplished by a movement device selected from the group consisting of rollers, wheels, swing devices, conveyors, or sliding apparatus.

20. An extrusion line system according to claim 16 wherein said turret device may be rotated manually.

21. An extrusion line system according to claim 16 additionally comprising a controller adapted to control said rotation of said turret device.

22. An extrusion line system according to claim 16 additionally comprising a cutting device adapted to receive said cooled, shaped flow exiting said cooling apparatus.

23. An extrusion line system according to claim 16 wherein said turret device additionally comprises a stand.

24. An extrusion line system according to claim 23 wherein said stand is adjustable.

25. An extrusion line system according to claim 16 wherein at least one of said first and second sizing apparatus comprises a set of hosing providing channels through said at least one of said first and second sizing apparatus.

26. An extrusion line system according to claim 25 wherein said turret device additionally comprises a quick disconnect adapted to allow one single connection point for said set of hosing.

27. An extrusion line system according to claim 25 wherein said set of hosing is adapted to provide at least one source selected from the group consisting of cooled liquid, cooled gas, and vacuum.

* * * * *

UNITED STATES PATENT AND TRADEMARK OFFICE
CERTIFICATE OF CORRECTION

PATENT NO.   : 6,592,351 B2
DATED        : July 15, 2003
INVENTOR(S)  : Herbert L. Hutchison et al.

It is certified that error appears in the above-identified patent and that said Letters Patent is hereby corrected as shown below:

<u>Column 5,</u>
Line 2, please delete "running, and" and insert -- running and --.

Signed and Sealed this

Eleventh Day of November, 2003

JAMES E. ROGAN
*Director of the United States Patent and Trademark Office*